(12) United States Patent
Hackert et al.

(10) Patent No.: US 11,265,516 B2
(45) Date of Patent: Mar. 1, 2022

(54) AUTONOMOUSLY MOBILE OUTDOOR DEVICE WITH A SURVEILLANCE MODULE

(71) Applicant: Vorwerk & Co. Interholding GmbH, Wuppertal (DE)

(72) Inventors: Georg Hackert, Bochum (DE); Martin Helmich, Duisburg (DE); Lorenz Hillen, Wuppertal (DE); Christian Holz, Dortmund (DE); Gerhard Isenberg, Cologne (DE); Hendrik Koetz, Wetter (DE); Andrej Mosebach, Bochum (DE); Roman Ortmann, Duisburg (DE); Robin Dulinski, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/041,983

(22) Filed: Jul. 23, 2018

(65) Prior Publication Data
US 2019/0028675 A1      Jan. 24, 2019

(30) Foreign Application Priority Data
Jul. 24, 2017   (DE) .................... 10 2017 116 658.0

(51) Int. Cl.
| | |
|---|---|
| *H04N 7/18* | (2006.01) |
| *G08B 13/196* | (2006.01) |
| *G08B 25/08* | (2006.01) |
| *G05D 1/02* | (2020.01) |
| *G08B 25/14* | (2006.01) |
| *G08B 29/18* | (2006.01) |

(Continued)

(52) U.S. Cl.
CPC .......... *H04N 7/185* (2013.01); *G05D 1/0088* (2013.01); *G05D 1/0274* (2013.01); *G06T 7/248* (2017.01); *G08B 13/196* (2013.01); *G08B 13/19647* (2013.01); *G08B 13/19656* (2013.01); *G08B 25/08* (2013.01); *G08B 25/10* (2013.01); *G08B 25/14* (2013.01); *G08B 29/18* (2013.01); *G05D 2201/0201* (2013.01); *G05D 2201/0203* (2013.01); *G05D 2201/0207* (2013.01); *G05D 2201/0208* (2013.01); *G05D 2201/0209* (2013.01); *G06T 2207/30252* (2013.01)

(58) Field of Classification Search
CPC ............. G05B 19/4061; G05D 1/0088; G05D 1/0274; G05D 2201/0201; G05D 2201/0203; G05D 2201/0207; G05D 2201/0208; G08B 13/00; H04N 7/185
USPC ......................................................... 348/148
See application file for complete search history.

(56) References Cited

U.S. PATENT DOCUMENTS

| | | | |
|---|---|---|---|
| 8,295,979 | B2 | 10/2012 | Thacher et al. |
| 8,321,365 | B2 | 11/2012 | Anderson |

(Continued)

FOREIGN PATENT DOCUMENTS

| | | |
|---|---|---|
| DE | 10 2015 111 392 A1 | 1/2017 |
| EP | 2 423 893 B1 | 4/2013 |

*Primary Examiner* — Kathleen V Nguyen
(74) *Attorney, Agent, or Firm* — Collard & Roe, P.C.

(57) ABSTRACT

A system consisting of a vehicle which is autarchically mobile in the outdoor area on a property and a surveillance module which can be attached to the vehicle, wherein the surveillance module has surveillance sensors for carrying out surveillance of the property. The surveillance module can be replaced with a work module. Plant care activities can be performed with the work module.

5 Claims, 2 Drawing Sheets

(51) Int. Cl.
    *G08B 25/10*     (2006.01)
    *G06T 7/246*     (2017.01)
    *G05D 1/00*     (2006.01)

(56) References Cited

U.S. PATENT DOCUMENTS

| | | |
|---|---|---|
| 9,251,698 B2 | 2/2016 | Vian et al. |
| 10,058,997 B1 | 8/2018 | Chao |
| 10,241,097 B2 | 3/2019 | Miresmailli et al. |
| 2002/0156556 A1* | 10/2002 | Ruffner ............... A01D 34/008 701/23 |
| 2004/0264761 A1 | 12/2004 | Mas et al. |
| 2006/0022818 A1* | 2/2006 | Piltonen ............... G07C 9/28 340/539.13 |
| 2006/0213167 A1 | 9/2006 | Koselka et al. |
| 2012/0127017 A1* | 5/2012 | Sasabuchi ............... G01S 7/411 342/70 |
| 2012/0239191 A1* | 9/2012 | Versteeg ............... G06N 3/004 700/246 |
| 2013/0116825 A1* | 5/2013 | Kim ............... A47L 11/20 700/259 |
| 2014/0303814 A1 | 10/2014 | Burema et al. |
| 2015/0163993 A1 | 6/2015 | Pettersson |
| 2015/0367513 A1* | 12/2015 | Gettings ............... B25J 9/1664 700/248 |
| 2016/0278599 A1* | 9/2016 | Seo ............... A47L 9/2826 |
| 2016/0292905 A1* | 10/2016 | Nehmadi ............... G01S 17/931 |
| 2017/0020087 A1 | 1/2017 | Younis et al. |
| 2017/0225336 A1* | 8/2017 | Deyle ............... G08B 13/196 |
| 2020/0409376 A1 | 12/2020 | Ebrahimi Afrouzi et al. |

\* cited by examiner

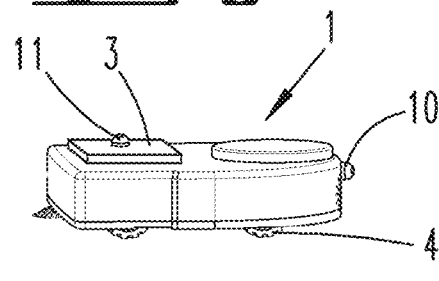
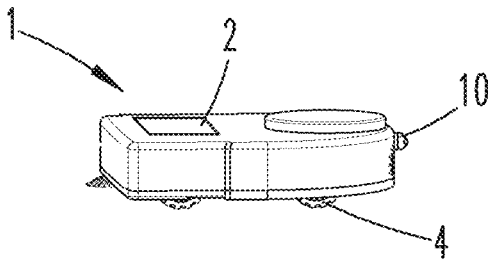
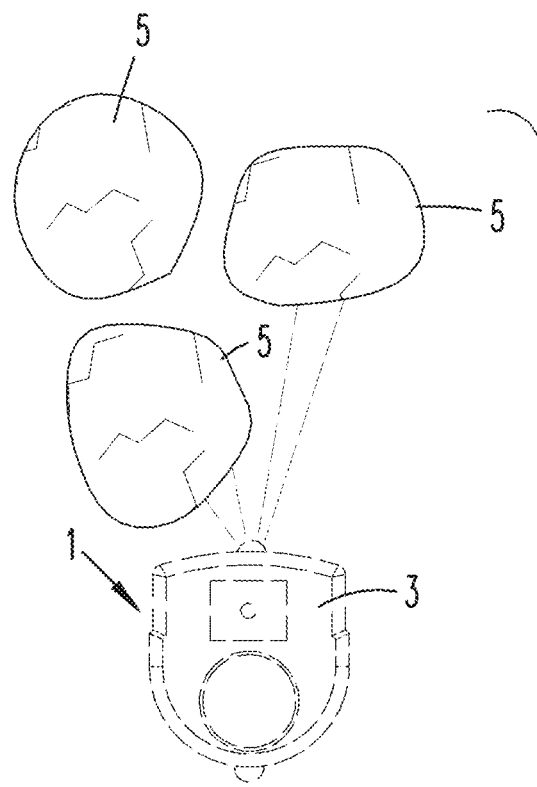
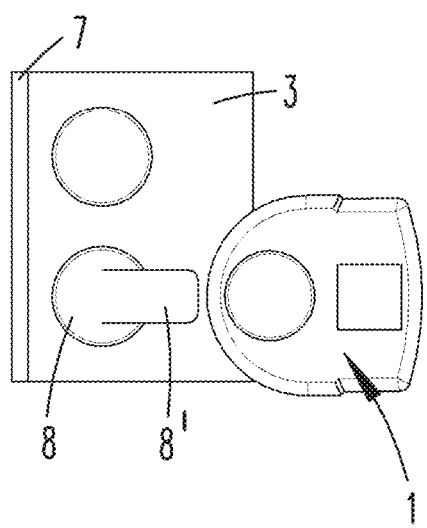
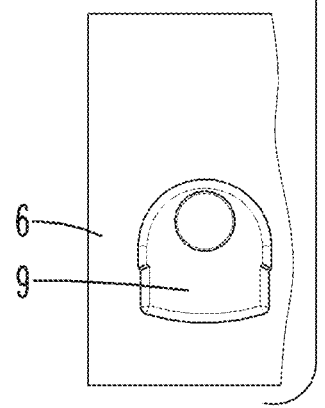

AUTONOMOUSLY MOBILE OUTDOOR DEVICE WITH A SURVEILLANCE MODULE

CROSS REFERENCE TO RELATED APPLICATIONS

Applicant claims priority under 35 U.S.C. § 119 of German Application No. 10 2017 116 658.0 filed Jul. 24, 2017, the disclosure of which is incorporated by reference.

BACKGROUND OF THE INVENTION

1. Field of the Invention

The invention relates to a system consisting of a first vehicle which is independently mobile in the outdoor area by means of a running gear that is controlled by a controller using control data acquired in contactless manner by a sensor system and optionally of a mapping function stored in a memory element, and having a surveillance device equipped with surveillance sensors.

The invention further relates to a method for operating an autarchically mobile vehicle in the outdoor area.

2. Description of the Related Art

Autarchic vehicles which are independently mobile in the outdoor area by means of a running gear that is controlled by a controller using control data acquired by a sensor system and optionally of a mapping function stored in a memory element are known for example as robotic lawnmowers, which are capable of mowing a lawn area automatically.

An independently mobile device for cleaning a ground area is known from EP 2 423 893 B1. The sweeping device described there has a sensor system for detection of objects in the area surrounding it. A mapping function is stored in the device, with which the device is able to orientate itself in the indoor area in order to carry out cleaning tasks. The device further includes a surveillance module, which is able to observe the surrounding area by means of sensors, in order to detect unauthorised entry into a building. The device is also in operative connection with other devices.

From DE 10 2015 111 392 A1, a method is known for operating a surface processing device which detects sounds of breaking glass with an ultrasonic sensor and is also capable of issuing an alarm in the event of a break-in.

SUMMARY OF THE INVENTION

The task underlying the invention is to further develop a vehicle that is independently mobile in the outdoor area in a manner that is advantageous to its use.

The vehicle according to the invention is a work unit which is equipped for autonomous operation in the outdoor area. An autonomous outdoor device of such kind is further developed according to the invention in that it is equipped with a surveillance module. The vehicle can carry out surveillance circuits with the surveillance module on a property to collect data on the surroundings, which is stored in a memory. For this purpose, the surveillance module has surveillance sensors which are able to function without contact, but also with contact. The surveillance sensors may be ultrasonic sensors, microphones, imaging sensors, particularly cameras. However, the sensors may also be light sensors. The sensors may include a device for image acquisition in visible light or for image acquisition in infrared, that is to say a thermal imaging camera. The surveillance module may also include a searchlight which is able to emit light in a specified direction. It may also include signal lighting and possess acoustic signal transmitters. With the surveillance sensor system, the device is capable of acquiring surrounding features within its area of operation on a property that is to be monitored. With distance sensors a change of location by an object or a person on the property may be detected. During surveillance passes, the device collects data on the positions of objects in the surveillance area. The surveillance passes are conducted by means of the navigation sensor system and a mapping function stored in a memory element. With the aid of the surveillance sensor system, which is allocated to the surveillance module, the surveillance module records data, particularly positional data of objects in the surveillance area and stores their position and arrangement information during every surveillance pass. This may be carried out in interaction with an imaging sensor, for example with a camera. A 3D model of an object may be created with the aid of an image analysis of the object recorded from various perspectives. Objects whose position and shape do not change over the course of multiple surveillance passes may be stored in the memory of the surveillance module as stationary objects. Objects whose size changes but whose position remains constant, may also be characterized as stationary objects, for example as a plant, the outline shape and therewith also the size of which change as a consequence of wind movement. Objects whose position changes may be identified as animals or people. Depending on the size of the moving object, the object may be identified as an intruder. If an object of such kind is identified, an alarm is triggered by the surveillance module and is forwarded to a base module or to an alarm centre via in particular a wireless communication device. The forwarding of an alarms or surveillance data may also be carried out via the internet, for example in the form of an email or through the mobile phone network via SMS. Instead of storing the data acquired on the surveillance pass in the surveillance module, this data may however also be stored externally, for example in an alarm centre in a building.

The surveillance module is a device with which the vehicle may be equipped optionally. According to a preferred variant of the invention, the vehicle is an autonomous plant care device, particularly a garden maintenance device. The device possesses a module carrier. With the aid of this module carrier, the device may be fitted with work modules that differ from each other. The module carrier and the module it supports are connected to each other mechanically by mechanical retaining means and electrically by a plug connector. An electrical power supply, and also data communication, may be assured via the plug connector. It is advantageous if the device can be fitted optionally with a work module or with a surveillance module. The work module includes a tool with which a plant care activity or a garden maintenance task can be carried out. Thus, a cutting module may have e.g. a cutting tool, a mowing module may have e.g. a mowing tool and a watering module may have e.g. a watering tool. During the day or at certain times of the day, the device may operate during a working period as an outdoor maintenance device by carrying out working or care tasks assigned to it with the aid of the work modules. The work modules and the surveillance module may be stored at a central location. This may be the same location as the location where a base station of the vehicle is located. This is preferably a roofed facility, for example a shed. During a time when the vehicle is not active tending the garden, it may be used as a surveillance device by replacing a work module with a surveillance module. Then, a change in the surroundings within the property under surveillance is analysed with the surveillance sensor on surveillance passes, and is evaluated as an alarm if it satisfies alarm criteria. With the surveillance module, an outdoor device may be reconfigured as a surveillance device. For this, the functionality of the device is expanded with optional sensors and actuators, e.g., touch sensitive sensors, for a surveillance activity. The surveillance module is preferably only mounted for surveillance phases, for example during the hours of darkness or during daylight hours when the property is otherwise not supervised. The mounting of the surveillance module on the vehicle may be carried out manually by the user or also in an automated process at the base station. Depending on the structure size of the surveillance module, however, this may also be attached permanently to the vehicle. It is further provided that the vehicle, that is to say the surveillance module, transmits information that is classified as security-related to a security system inside the house during a surveillance pass. However, the transmission may also take place to an autonomous device in the indoor area which is responsible for security tasks. Such a device operating in the indoor area may be for example an area processing device which additionally performs a surveillance activity. It is further provided that the autonomous outdoor device is in data exchange connection with the autonomous indoor device or with a stationary indoor device, so that data relating to objects moving in the outdoor area, particularly the shape of the objects, may be forwarded to the device operating indoors, so that the device operating indoors can identify the object if it comes into the detection area of the surveillance device operating indoors. With the surveillance module according to the invention, the vehicle is capable of determining the presence of persons moving on the property under surveillance and in particular is capable of transmitting the current position of the person to an alarm centre or to a device operating in the indoor area. The device operating in the indoor area is thus informed about the position where an object moving in such manner approaches the building. It may then bring itself into a position to perform surveillance of this site from the interior area.

BRIEF DESCRIPTION OF THE DRAWINGS

In the following text, an embodiment of the invention will be explained with reference to accompanying drawings. The drawings show.

DETAILED DESCRIPTION OF THE PREFERRED EMBODIMENTS

Figure 1:
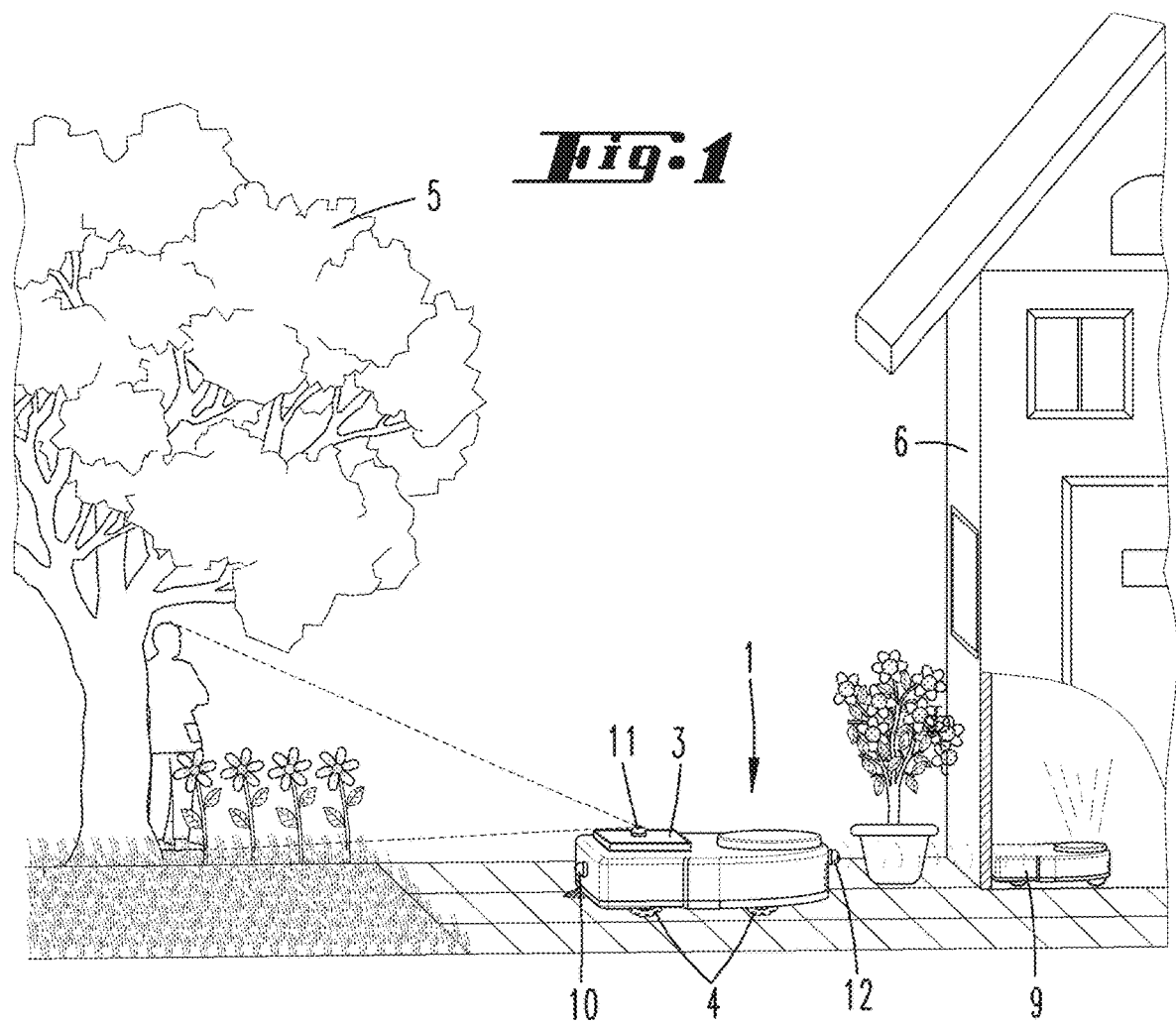
FIG. 1 a schematic representation of an outdoor device according to the invention embodied as a work unit engaged in outdoor operation, FIG. 2 a schematic, perspective representation of the outdoor device with a surveillance module 3, FIG. 3 the vehicle 1 without a module mounted on a module carrier 2, FIG. 4 the plan view of a property for which surveillance is to be assured, with a base station 7, plants 5 and a building 6.

The vehicle 1 represented in FIG. 1 is an autonomous outdoor device. It is powered by a rechargeable battery and has a running gear 4 driven by an electric motor, which enable the vehicle 1 to move autonomously. Navigation sensors 10 which cooperate with a controller arranged in the vehicle 1 are provided to enable autonomous mobility of the vehicle. The controller is a program-controlled microcontroller with memory means and other peripherals. A mapping function of the property is stored in the memory means, in which trees, plants, buildings and other obstacles are stored. With the aid of the navigation sensor system 10 and the mapping function, the vehicle 1 is able to conduct surveillance passes in the outdoor area on the property, or to move to predefined locations at which tending work may be carried out with a work unit.

One or more work modules 8 may be provided, each of which carries a tool 8'. The tools 8' may be cutting tools, watering tools, digging tools or other kinds of tools which are used in garden work. During certain times, particularly during the day, the vehicle 1 is employed as an autonomously working garden care device and carries one of preferably several work modules 8 with a work module-specific tool 8' on a module carrier 2.

A base station 7 is provided, on which the work modules 8 and a surveillance module 3 may be stored. The rechargeable battery of the vehicle 1 may also be supplied with electrical energy at the base station 7.

The vehicle 1 is convertible into a surveillance device which can conduct surveillance passes on the property autarchically by replacement of the work module 8 with the surveillance module 3. For this, the work module 8 is replaced with a surveillance module 3 manually by the user. The replacement may also be performed automatically, for example with grippers arranged on the base station 7 or with other assistance means. However, the vehicle 1 may also be equipped permanently with a surveillance module 3.

The surveillance module 3 possesses a surveillance sensor system which includes surveillance sensors 11. Conditions in the surrounding area may be captured with the surveillance sensors 11. For example, one surveillance sensor 11 may be a camera. One surveillance sensor 11 may be an ultrasonic sensor or an infrared sensor. Moreover, the surveillance sensor 11 may also be a distance sensor, distances may be calculated by radar for example.

The surveillance module 3 and the image analysis device or sensor signal analysis device integrated in the surveillance module 3 is capable of analysing the sensor data acquired by the surveillance sensors 11 in order to store those locations where stationary objects are present, and what geometric shape such objects have. This data is refined in the course of many surveillance passes. Areas in which it is permissible for the objects to move and/or change shape may also be detected. In this way, it may be ensured that false alarms are not triggered in windy weather and by plants that are moved by the wind.

The surveillance module 3 may further detect whether an object is an object that is able to move, for example an animal or a person. It captures the size of the object and captures the changing position of the object. On the basis of the size of the object, the surveillance module 3 may also determined whether such an object might be an intruder. With an IR sensor, it may be determined whether object radiates heat. In particular, the use of a thermal imaging camera is provided.

The sensor data acquired by the surveillance sensors 11 are analysed in terms of both quality and quantity for the purpose of determining whether these are "normal" occurrences or whether they are "security-critical" occurrences. If the sensor data are analysed to the effect that a "security-critical" occurrence is present, an alarm is issued.

This takes place via a communication device 12, which may cooperate with the base station 7. However, the communication device 12 may also cooperate with a surveillance device which is arranged in the interior of a building 6. A second surveillance device 9 of such kind may also be a work unit, e.g., a work unit such as is described in EP 2 423 893 B1, and for this reason the content of that document is incorporated in its entirety in the disclosure of the present application.

The surveillance module 3 may capture shape data which reflect the spatial configuration of an object and forward it to the surveillance device 9 arranged in the interior of the building 6. The surveillance device 9 working in the interior of the building 6 is thus able to identify the object on the basis of matching shape features if it approaches the building 6. A surveillance which is begun in the outdoor area may thus be transferred from the outdoor area to the indoor area. A transfer in the reverse direction of the surveillance focus from the indoor area to the outdoor area is possible if the shape information is communicated by the surveillance device 9 working in the interior of the building 6 to the surveillance module 3 working in the outdoor area via the communication device 12. The communication device 12 may be a WLAN connection, a Bluetooth connection or another suitable data transmission link.

LIST OF REFERENCE SIGNS

1 Vehicle
2 Module carrier
3 Surveillance module
4 Running gear
5 Plant
6 Building
7 Base station
8 Work module
8' Tool
9 Work unit
10 Sensor system
11 Surveillance sensor
12 Communication device

What is claimed is:

1. A system comprising:
a first vehicle in a form of an autonomous plant care device, which is independently mobile in an outdoor area outside of a building and has a running gear that is controlled by a controller, wherein the controller uses control data acquired by sensors of a sensor system and optionally a mapping function stored in a memory element,
a surveillance module configured for detecting trespassing by an object and/or a person on a property that is to be monitored and for triggering an alarm, wherein the surveillance module is equipped with surveillance sensors and device for analyzing images or sensor signals from the surveillance sensors,
a work module configured to carry out a cleaning or tending activity, and
a second vehicle in a form of an indoor area processing device configured to be used in an interior of the building,
wherein the first vehicle further has a module carrier configured for accommodation of the surveillance module or the work module, so that the first vehicle is convertible into a surveillance device by replacement of the work module with the surveillance module, so during a first time period, the first vehicle operates as an autonomous plant care device using the work module, and during a second period, the vehicle operates as a surveillance device using the surveillance module,
wherein the first vehicle further has a communication device configured for exchanging data with the second vehicle,
wherein the device for analyzing images or sensor signals is configured to store sensor signals of objects over several passes of the first vehicle to determine a shape, size and movement of an object in the outdoor area and to classify the object as stationary or moving, wherein an object that changes shape but not location over the several passes is classified as stationary,
wherein the device for analyzing images or sensor signals is further configured to define areas in which stationary objects in the outdoor area at least partially change shape while staying in the same location without triggering the alarm,
wherein the communication device of the first vehicle and a communication device of the second vehicle are configured such that the first vehicle forwards data relating to a shape of an object moving in the outdoor area, and a current position of the object, to the second vehicle,
wherein the second vehicle is configured to identify the object if the object enters a detection area of the second vehicle, by matching a shape of the object detected by the second vehicle with the shape forwarded by the first vehicle, and move into a position to perform surveillance from an interior area of a position where the object approaches the building.

2. The system according to claim 1, wherein the second vehicle has a running gear controlled by a controller, wherein the controller is configured to use control data acquired by sensors of a sensor system and optionally a mapping function stored in a memory element.

3. A method for operating the system according to claim 1 for assuring surveillance of an outdoor area, the method comprising:
equipping the first vehicle with the surveillance module for a surveillance period, and equipping the first vehicle with the work module having a tool for a working period,
forwarding data from the communication device of the first vehicle to the communication device of the second vehicle regarding the shape of an object moving in the outdoor area, and a current position of the object,
identifying with the second vehicle the object if the object enters the detection area of the second vehicle, and
moving the second vehicle into a position to perform surveillance from the interior area of the position where the object approaches the building.

4. The method according to claim 3, further comprising steps of:
capturing with the first vehicle current features of the surroundings continuously during a surveillance pass through an outdoor area,
storing the current features in a memory,
comparing the current features of surroundings with a captured and stored record of the features of the surroundings acquired in at least one previous surveillance pass,
analysing a deviation between the current features of the surroundings and the stored features of the surroundings both quantitatively and qualitatively, and
evaluating said deviation in order to issue an alarm.

5. The method according to claim 3, further comprising steps of: capturing a spatial change of objects, and forwarding data characterizing a spatial structure of the object to the second vehicle.

* * * * *